United States Patent
Lee et al.

(10) Patent No.: US 10,080,203 B2
(45) Date of Patent: Sep. 18, 2018

(54) POWER HEADROOM REPORTING METHOD IN WIRELESS COMMUNICATION SYSTEM SUPPORTING CHANGE IN USE OF WIRELESS RESOURCE AND APPARATUS FOR SAME

(71) Applicant: LG ELECTRONICS INC., Seoul (KR)

(72) Inventors: Seungmin Lee, Seoul (KR); Suckchel Yang, Seoul (KR); Hyukjin Chae, Seoul (KR); Daesung Hwang, Seoul (KR); Inkwon Seo, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/784,915

(22) PCT Filed: Apr. 22, 2014

(86) PCT No.: PCT/KR2014/003500
§ 371 (c)(1),
(2) Date: Oct. 15, 2015

(87) PCT Pub. No.: WO2014/175634
PCT Pub. Date: Oct. 30, 2014

(65) Prior Publication Data
US 2016/0142984 A1 May 19, 2016

Related U.S. Application Data

(60) Provisional application No. 61/814,818, filed on Apr. 22, 2013, provisional application No. 61/836,147, (Continued)

(51) Int. Cl.
*H04W 4/00* (2018.01)
*H04W 52/36* (2009.01)
*H04W 72/04* (2009.01)

(52) U.S. Cl.
CPC ..... *H04W 52/365* (2013.01); *H04W 72/0413* (2013.01); *H04W 72/0473* (2013.01)

(58) Field of Classification Search
CPC . H04W 72/082; H04W 72/042; H04J 11/004; H04B 1/7107; H04L 5/0044
See application file for complete search history.

(56) References Cited

U.S. PATENT DOCUMENTS 9,794,894 B2 * 10/2017 Feuersaenger ...... H04W 52/365
2011/0038271 A1 * 2/2011 Shin ...................... H04W 52/08
370/252

(Continued)

FOREIGN PATENT DOCUMENTS

CN 102067480 A 5/2011
CN 102948090 A 2/2013
(Continued)

*Primary Examiner* — Clemence S Han
(74) *Attorney, Agent, or Firm* — Dentons US LLP

(57) ABSTRACT

The present invention proposes a power headroom reporting method and apparatus of a terminal in a wireless communication system supporting a change in use of wireless resources. More particularly, the method comprises the steps of: determining whether power headroom reporting is triggered; and transmitting power headroom reporting (PHR) information for first upper link wireless resource and second upper link wireless resource to a base station, wherein the first upper link wireless resource is configured to allow the use of the wireless resource to be dynamically changed and the second upper link wireless resource is configured to prevent the use of the wireless resources from being dynamically changed.

13 Claims, 11 Drawing Sheets

Related U.S. Application Data filed on Jun. 17, 2013, provisional application No. 61/864,482, filed on Aug. 9, 2013.

(56) References Cited

U.S. PATENT DOCUMENTS

| | | | |
|---|---|---|---|
| 2011/0134774 A1* | 6/2011 | Pelletier | H04W 52/365 370/252 |
| 2012/0224552 A1* | 9/2012 | Feuersanger | H04L 5/0007 370/329 |
| 2012/0302173 A1* | 11/2012 | Bostrom | H04W 52/365 455/67.11 |
| 2012/0327871 A1* | 12/2012 | Ghosh | H04L 5/0023 370/329 |
| 2013/0010720 A1* | 1/2013 | Lohr | H04L 1/0026 370/329 |
| 2014/0023010 A1* | 1/2014 | Loehr | H04W 52/365 370/329 |
| 2014/0029586 A1* | 1/2014 | Loehr | H04W 56/0005 370/336 |
| 2014/0056278 A1* | 2/2014 | Marinier | H04W 72/044 370/330 |
| 2015/0031410 A1* | 1/2015 | Lim | H04W 52/146 455/522 |
| 2015/0201412 A1* | 7/2015 | Suzuki | H04W 52/365 370/329 |
| 2016/0029239 A1* | 1/2016 | Sadeghi | H04W 24/10 370/252 |

FOREIGN PATENT DOCUMENTS

| | | | | |
|---|---|---|---|---|
| CN | 103053195 A | 4/2013 | | |
| EP | 2509373 A1 | 10/2012 | | |
| JP | 2016519507 A | 6/2016 | | |
| KR | 1020090131653 A | 12/2009 | | |
| KR | 1020120016987 A | 2/2012 | | |
| KR | 1020120108345 A | 10/2012 | | |
| KR | 1020130027086 A | 3/2013 | | |
| KR | 1020130038370 A | 4/2013 | | |
| WO | WO 2012021002 A2 * | 2/2012 | | H04W 24/10 |
| WO | 2013049769 A1 | 4/2013 | | |
| WO | 2014165510 A1 | 10/2014 | | |

* cited by examiner

FIG. 2
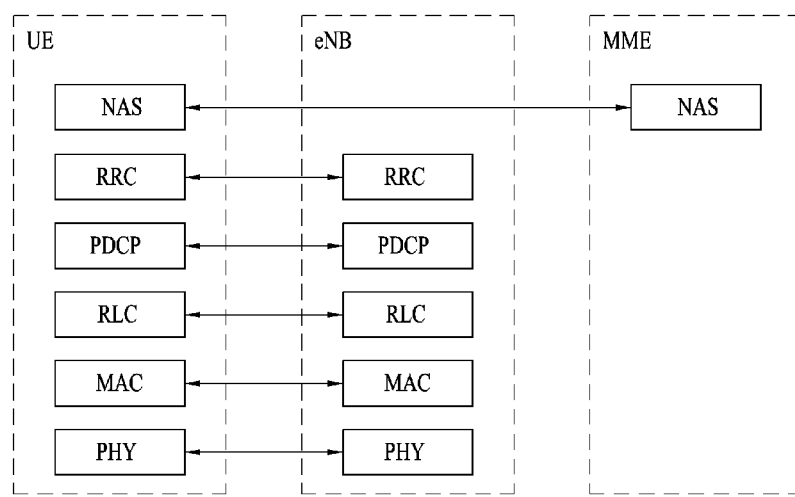
(a) Control-plane protocol stack
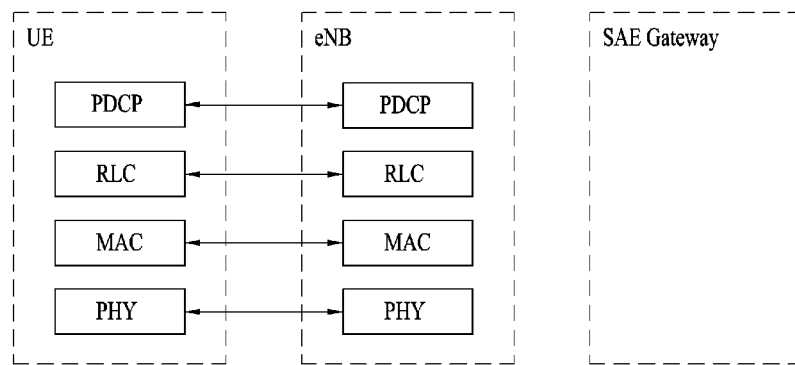
(b) User-plane protocol stack

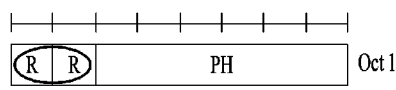
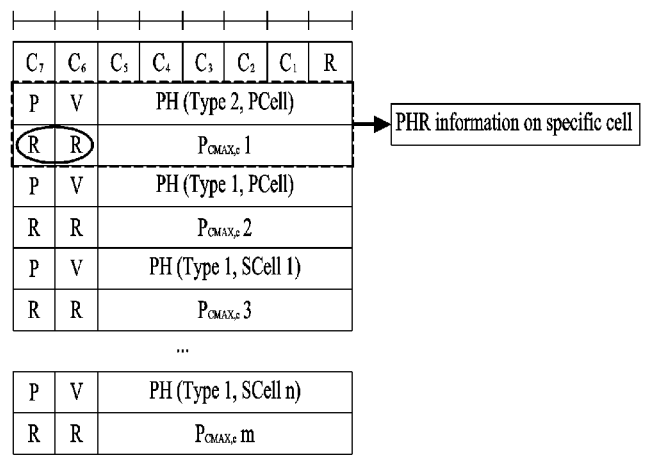

POWER HEADROOM REPORTING METHOD IN WIRELESS COMMUNICATION SYSTEM SUPPORTING CHANGE IN USE OF WIRELESS RESOURCE AND APPARATUS FOR SAME

This application is a National Stage Application of International Application No. PCT/KR2014/003500, filed Apr. 22, 2014, and claims the benefit of U.S. Provisional Application No. 61/864,482, filed Aug. 9, 2013, U.S. Provisional Application No. 61/836,147, Jun. 17, 2013, and U.S. Provisional Application No. 61/814,818, filed Apr. 22, 2013, all of which are hereby incorporated by reference in their entirety for all purposes as if fully set forth herein.

TECHNICAL FIELD

The present invention relates to a wireless communication system, and more particularly, to a method of performing power headroom reporting (PHR) in a wireless communication system supporting a change of usage of a wireless resource and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

A user equipment periodically and/or aperiodically reports state information of a current channel to a base station to assist efficient management of a wireless communication of the base station. Since the state information of the reported channel may include results calculated in consideration of various situations, it is required to have a more efficient reporting method.

DISCLOSURE OF THE INVENTION

Technical Task

A technical task of the present invention is to propose a power headroom reporting method in a wireless communication system supporting a change of usage of a wireless resource and an apparatus therefor based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing power headroom reporting in a wireless communication system supporting usage change of a radio resource includes the steps of determining whether the power headroom reporting is triggered and transmitting power headroom reporting (PHR) information on a first uplink (UL) radio resource and a second UL radio resource to a base station. In this case, the first UL radio resource is configured to dynamically change usage of a radio resource and the second UL radio resource is configured not to dynamically change the usage of the radio resource.

Preferably, the power headroom reporting (PHR) information includes a first PHR value for the first UL radio resource and a second PHR value for the second UL radio resource and the first PHR value and the second PHR value are determined in a manner of being independent from each other.

Preferably, the power headroom reporting (PHR) comprises a representative power headroom reporting (PHR) value and the representative PHR value corresponds to a smaller PHR value among a first PHR value for the first UL radio resource and a second PHR value for the second UL radio resource.

Preferably, the method can further include the step of receiving information related to reference maximum power from the base station. In this case, the reference maximum power is set to the first UL radio resource and the second UL radio resource, respectively, and the power headroom reporting (PHR) information is determined based on the reference maximum power.

Preferably, the power headroom reporting (PHR) is configured to be transmitted via a predetermined UL radio resource only when uplink data (physical uplink shared channel (PUSCH)) is transmitted.

Preferably, the power headroom reporting (PHR) is configured to be transmitted via a predetermined UL radio resource only when uplink data (physical uplink shared channel (PUSCH)) is transmitted.

Preferably, the power headroom reporting (PHR) is configured to be transmitted via a predetermined UL radio resource only when uplink data (physical uplink shared channel (PUSCH)) is transmitted.

Preferably, the power headroom reporting (PHR) is configured to be calculated for a single radio resource only among the first UL radio resource and the second UL radio resource.

Preferably, the method can further include the step of receiving an indicator indicating a specific UL radio resource from the base station.

Preferably, the method can further include the step of transmitting at least one or more fields on a specific signal format, which are received from the base station, in a manner of configuring the at least one or more fields as an indicator indicating a specific UL radio resource.

Preferably, the first UL radio resource and the second UL radio resource are configured to be commonly applied by a specific timer.

Preferably, the power headroom reporting (PHR) information is restricted to a type 1 PHR or a type 2 PHR.

Preferably, the power headroom reporting (PHR) information is derived based on a power control command until timing of receiving UL control information or timing of a UL frame in which actual PUSCH is transmitted.

To further achieve these and other advantages and in accordance with the purpose of the present invention, according to a different embodiment, a user equipment performing power headroom reporting in a wireless communication system supporting usage change of a radio resource includes a radio frequency unit and a processor, the processor configured to determine whether the power headroom reporting is triggered, the processor configured to transmit power headroom reporting (PHR) information on a first uplink (UL) radio resource and a second UL radio resource to a base station. In this case, the first UL radio resource is configured to dynamically change usage of a radio resource and wherein the second UL radio resource is configured not to dynamically change the usage of the radio resource.

Advantageous Effects

According to embodiments of the present invention, it is able to efficiently perform power headroom reporting in a wireless communication system supporting a change of usage of a wireless resource.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

FIG. 10 is a diagram for cases of applying the present embodiment to a power headroom MAC control element and an extended power headroom MAC control element;

BEST MODE

Mode for Invention

Figure 1:
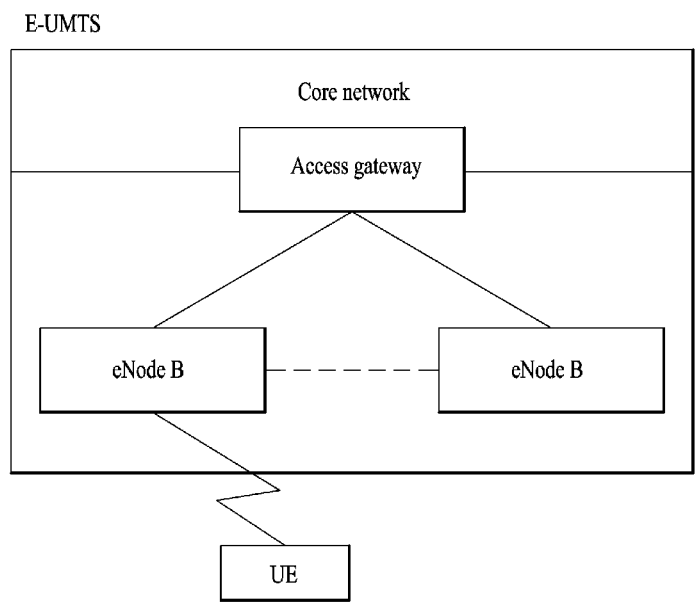
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
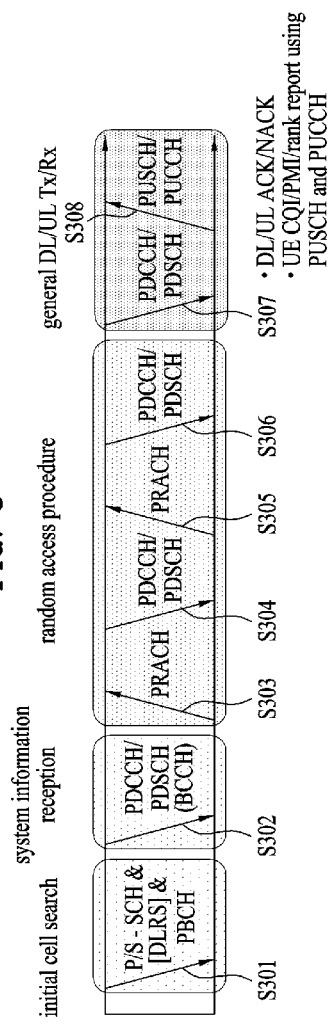
FIG. 3 is a diagram for explaining physical channels used for 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
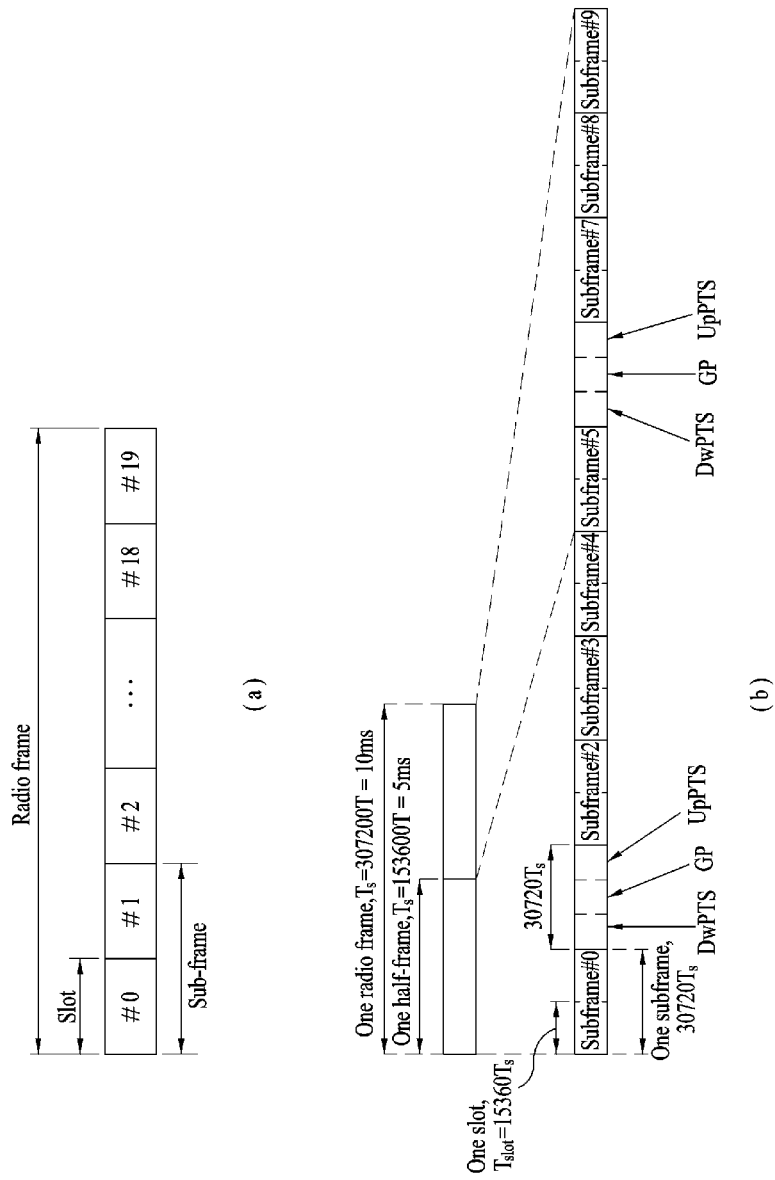
FIG. 4 is a diagram for a structure of a radio frame in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

In the following, power headroom reporting is explained.

A power headroom reporting procedure is performed to provide not only i) information on a difference between nominal terminal maximum transmit power and power estimated for UL-SCH transmission for an activated serving cell but also ii) information on a difference between nominal terminal maximum transmit power and power estimated for UL-SCH and PUCCH transmission on a PCell to a serving eNB. For more details on a reporting period, delay and mapping for power headroom, it may refer to LTE standard 3GPP TS 36.133, paragraph 9.1.8.

RRC configures two timers (i.e., periodicPHR-Timer and prohibitPHR-timer) to trigger power headroom reporting, signals dl-PathlossChnage to configure change of power backoff due to a measured path loss and power management (allowed by P-MPR$_c$) and controls the power headroom reporting. In this case, the P-MPR$_c$ corresponds to transmit power reduction value which is applied to satisfy a requirement of an SAR (specific absorption rate: controlling electromagnetic wave impacting on a body to be equal to or less than a prescribed reference). The P-MPR$_c$ is determined in consideration of a distance between a device and a body. For instance, if a distance between a device and a body is close, a value of total transmit power of the device should be lowered. To this end, a higher value is applied for the P-MPR$_c$ On the contrary, if there is considerable distance between the device and the body, a lower value is applied to the P-MPR$_c$ because it is O.K. to increase the total transmit power value.

Moreover, the power headroom reporting can be triggered by one of events described in the following.

When the prohibitPHR-Timer is expired or when the prohibitPHR-Timer is expired and a path loss is changed more than dl-PathlossChange (dB unit) for at least one or more activated serving cells. In this case, the dl-PathlossChange can be used as a path loss reference after most recent transmission when a UE has UL resources for new transmission.

When the periodicPHR-Timer is expired.

PHR function is configured/reconfigured by higher layer. (In this case, when the PHR function is not inactivated)

When uplink activates a configured Scell.

When a UE has an uplink (UL) resource for new transmission, a case that the periodicPHR-Timer is expired or a case that the periodicPHR-Timer is expired and the UE receives UL configuration for activated serving cells within TTI.

When a UE has an uplink (UL) resource for new transmission or PUCCH transmission, a case that power backoff necessary for managing power for a corresponding cell (the UE has UL resource for transmission or PUCCH transmission to the cell) is greater than dl-PathlossChange according to most recent PHR transmission.

When a resource for new transmission is allocated to the UE within the TTI:

If the resource corresponds to a first UL resource for new transmission after last MAC reset, initiate the periodicPHR-timer.

If the power headroom procedure determines that at least one or more PHR are triggered and the at least one or more PHR are not cancelled, As a result of performing LCR (logical channel prioritization) on an allocated UL resource, when an extended PHR (extendedPHR) is not configured, if it is able to accept a PHR MAC control element and a sub header or when the extended PHR (extendedPHR) is configured, if it is able to accept a PHR MAC control element and a sub header:

If the extended PHR (extendedPHR) is configured, for each serving cell to which uplink is set, a type 1 power headroom value is obtained.

If a UE has an UL resource for transmission for the serving cell within TTI, a value corresponding to a $P_{CMAX,c}$ field can be obtained from a physical layer.

If PUCCH-PUSCH simultaneous transmission is configured:

a type 1 power headroom value is obtained.

If a UE performs PUCCH transmission within TTI, a value corresponding to a $P_{CMAX,c}$ field can be obtained from a physical layer.

In order to transmit an extended control element based on a value reported (i.e., corresponding to the $P_{CMAX,c}$ field) from the physical layer, multiplexing and assembly procedure are indicated. (For more details, it may refer to LTE standard document 3GPP TS.321, 6.1.3.6a "Extended power headroom MAC control element".)

If the extended PHR (extendedPHR) is not configured, a type 1 power headroom value is obtained, in order to transmit an extended control element based on a value reported (i.e., corresponding to the $P_{CMAX,c}$ field) from the physical layer, multiplexing and assembly procedure are indicated.

The periodicPHR-Timer is started or restarted,

The prohibitPHR-Timer is started or restarted, all triggered PHRs are cancelled.

In the following, a power headroom MAC control element is explained.

The power headroom MAC control element is checked by an LCID (logical channel ID) of a MAC PDU sub header shown in Table 3 in the following.

TABLE 3

| Index | LCID values |
|---|---|
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

Figure 5:
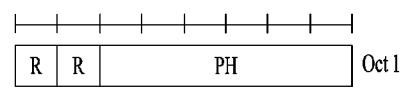
FIG. 5 is an exemplary diagram for a power headroom MAC control element.

FIG. 5 is an exemplary diagram for a power headroom MAC control element. In FIG. 5, the power headroom MAC control element has a fixed size and is configured by a single octet. In FIG. 5, R indicates a reserved bit and is configured by "0". And, power headroom (PH) indicates a field indicating a power headroom level and a length of the field corresponds to 6 bits. A reported PH and a power headroom level corresponding to the reported PH are shown in Table 4 in the following (For a measured DB value corresponding to Table 4, it may refer to LTE standard document 3GPP TS 36.133, paragraph 9.1.8.4).

TABLE 4

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

In the following, an extended power headroom MAC control element is explained.

Figure 6:
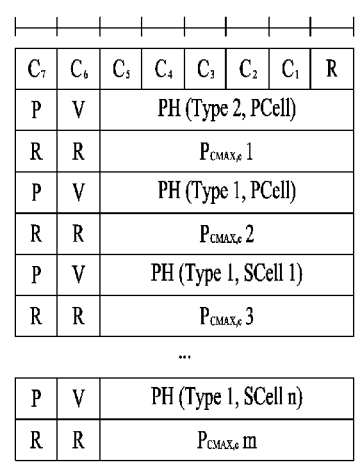
FIG. 6 is an exemplary diagram for an extended power headroom MAC control element.

The extended power headroom MAC control element is checked according to a MAC PDU sub header including an LCID (logical channel ID) shown in Table 3. (Unlike the power headroom MAC control element shown in FIG. 5,) the extended power headroom MAC control element is defined as shown in FIG. 6 and may have a variable size.

In case of reporting a type 2 power headroom, an octet including a type 2 PH field is included after an octet indicating existence of PH for each Scell and an octet including a $P_{CMAX,c}$ field appears after the octet including the type 2 PH field (if reported). A PCell indicated on a bitmap, an octet including a type 1 PH field for each Scell and a relevant $P_{CMAX,c}$ field (if reported) are included according to an ascending order based on ServCellIndex.

The extended power headroom MAC control element is defined as follows.

$C_i$: This field indicates whether a PH field for ScellIndex i exists. If the $C_i$ corresponds to "1", it indicates that a PH value is reported in a Scell including the ScellIndex i. If the $C_i$ corresponds to "0", it indicates that a PH value is not reported in the Scell including the ScellIndex i.

R: This field indicates a reserved bit and is configured by "0".

V: This field indicates whether a PH value corresponds to a PH value based on actual transmission or a PH value for a reference format. In case of a type 1 power headroom (PH), if the V corresponds to 0, it indicates that there is actual PUSCH transmission. If the V corresponds to 1, it indicates that a PUSCH reference format is used. In case of a type 2 power headroom (PH), if the V corresponds to 0, it indicates that there is actual PUCCH transmission. If the V corresponds to 1, it indicates that a PUCCH reference format is used. In case of both the type 1 PH and the type 2 PH, if the V corresponds to 0, it indicates that a relevant $P_{CMAX,c}$ field is omitted.

Power headroom (PH): This field indicates a power headroom level and a length of this field is 6 bits. A reported PH and a power headroom level corresponding to the reported PH are shown in Table 5 in the following (For a measured DB value corresponding to Table 5, it may refer to LTE standard document 3GPP TS 36.133, paragraph 9.1.8.4).

TABLE 5

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

P: This field indicates whether a UE applies power backoff (allowed by P-MPR$_c$) due to power management. If the power backoff due to the power management is not applied and a corresponding $P_{CMAX,c}$ field has a different value, the P corresponds to 1.

$\tilde{P}_{CMAX,c}$: If existing, this field indicates $P_{CMAX,c}$ or $\tilde{P}_{CMAX,c}$ used for calculating a preceding PH field. A reported $P_{CMAX,c}$ and a nominal UE transmit power level corresponding to the reported $P_{CMAX,c}$ are shown in Table 6 in the following (For a measured DB value corresponding to Table 6, it may refer to LTE standard document 3GPP TS 36.133, paragraph 9.6.1).

TABLE 6

| $C_7$ | $C_6$ | $C_5$ | $C_4$ | $C_3$ | $C_2$ | $C_1$ | R |
|---|---|---|---|---|---|---|---|
| P | V | | | PH (Type 2, PCell) | | | |
| R | R | | | $P_{CMAX,\,c}$ 1 | | | |
| P | V | | | PH (Type 1, PCell) | | | |
| R | R | | | $P_{CMAX,\,c}$ 2 | | | |
| P | V | | | PH (Type 1 SCell 1) | | | |
| R | R | | | $P_{CMAX,\,c}$ 3 | | | |
| | | | | ... | | | |
| P | V | | | PH (Type 1, SCell n) | | | |
| R | R | | | $P_{CMAX,\,c}$ m | | | |

In this case, $P_{CMAX,c}(i)$ indicates "UE transmit power configured for a subframe i of a serving cell c" and $\tilde{P}_{CMAX,c}(i)$ indicates a linear value of the $P_{CMAX,c}(i)$ (For more details on this, it may refer to 3GPP TS 36.213, paragraph 5.1.1 "Physical uplink shared channel"). Moreover, for more details on the power headroom reporting, the extended PHR and the like, it may refer to LTE standard document 3GPP TS 36.321.

Figure 7:
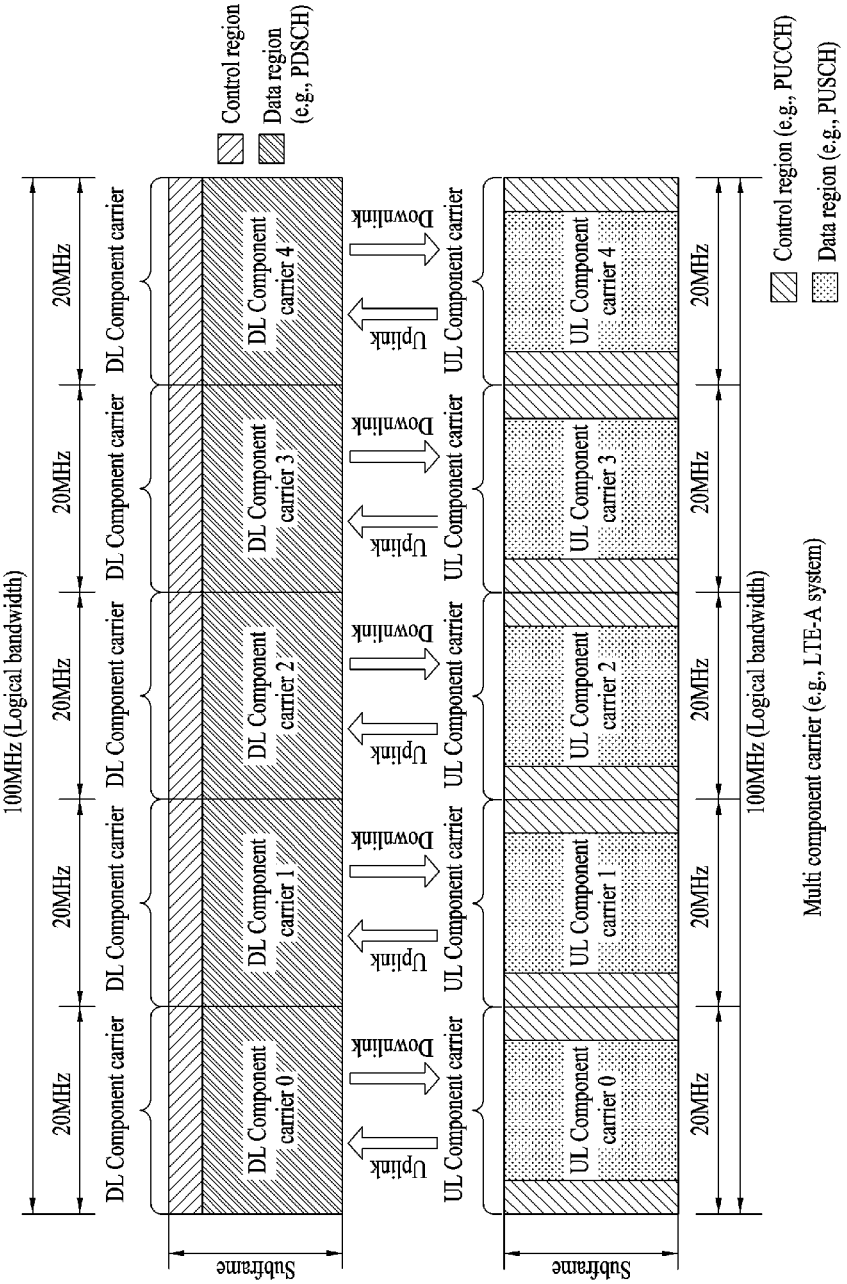
FIG. 7 is a diagram for an example of a carrier aggregation (CA) communication system.

FIG. 7 is a diagram for an example of a carrier aggregation (CA) communication system.

Referring to FIG. 7, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). A baseline of PDCCH transmission can be summarized as follows.

CIF disabled: PDCCH on DL CC allocates a PDSCH resource on the same DL CC or a PUSCH resource on a singly linked UL CC.

No CIF

Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.

Expanded LTE DCI format including a CIF

CIF (if configured) is a stationary x-bit field (e.g., x=3)

CIF (if configured) position is fixed irrespective of a DCI format size

Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 8:
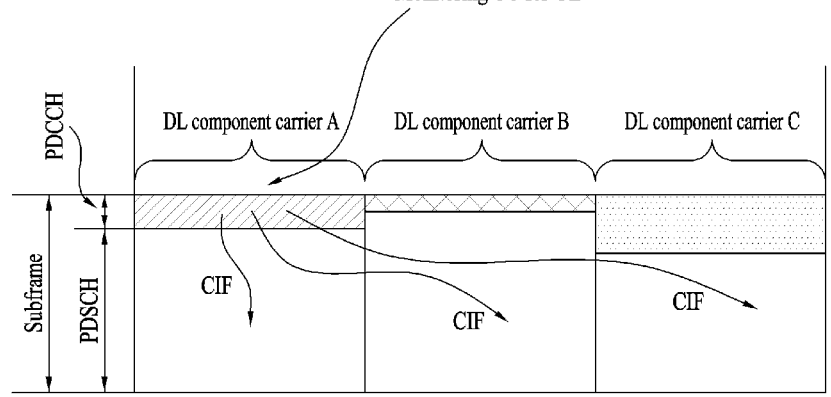
FIG. 8 is a diagram for an example of scheduling in case of aggregating a plurality of carriers with each other.

FIG. 8 is a diagram for an example of a scheduling in case that a plurality of carriers are aggregated with each other. Assume that 3 DL CCs are aggregated with each other and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

In the following description, when a plurality of cells dynamically change a usage of a radio resource according to system load state of a plurality of the cells, the present invention proposes a method for a UE to efficiently configure and report power headroom reporting (PHR) information is explained.

In the following description, for clarity, embodiments of the present invention are explained based on 3GPP LTE system. Yet, a range of a system to which the present invention is applied can be extended to other systems except 3GPP LTE system. The embodiments of the present invention can also be extended and applied to a case that a resource on a specific cell or a component carrier (CC) is dynamically changed according to system load state in environment to which carrier aggregation (CA) is applied. And, the embodiments of the present invention can also be extended and applied to a case that a usage of a radio resource is dynamically changed in a TDD system or a FDD system.

Moreover, for clarity, assume a situation that each cell dynamically changes a usage of a legacy radio resource according to a system load state of each cell in TDD system environment.

In the present invention, (legacy) radio resources can be classified into two types of resources according to a dynamic change of a usage of the radio resources. For instance, the (legacy) radio resources can be classified into a resource set used for a static usage or a fixed usage (i.e., a static resource) and a resources set of which a usage is dynamically changed (i.e., a flexible resource).

In this case, as an example, a resource set used for a usage identical to UL-DL configuration on SIB is defined as a static resource set and a resource set used for a usage different from the UL-DL configuration on the SIB can be defined as a flexible resource set.

As a different example, a resource set used for a usage identical to UL-DL configuration, which is configured at previous usage change timing (e.g., a usage change period-based usage change scheme defined in advance), is defined as a static resource set and a resource set used for a usage different from the UL-DL configuration, which is configured at the previous usage change timing, can be defined as a flexible resource set.

As a further different example, a resource set used for a usage identical to UL-DL configuration of a reference DL HARQ timeline defined in advance is defined as a static resource set (e.g., this set can be used for defining a static UL resource set only) and a resource set used for a usage different from the UL-DL configuration of the reference DL HARQ timeline defined in advance can be defined as a flexible resource set (e.g., this set can be used for defining a flexible (UL/DL) resource set only).

As a further different example, a resource set used for a usage identical to UL-DL configuration of a reference UL HARQ timeline defined in advance is defined as a static resource set (e.g., this set can be used for defining a static DL resource set only) and a resource set used for a usage different from the UL-DL configuration of the reference UL HARQ timeline defined in advance can be defined as a flexible resource set (e.g., this set can be used for defining a flexible (UL/DL) resource set only).

In this case, as an example, a reference DL/UL HARQ timeline (i.e., a HARQ timeline configured to maintain a stable HARQ timeline irrespective of a (re)configuration of UL-DL configuration) can be configured by i) a DL/UL HARQ timeline of UL-DL configuration including union of DL subframes of reconfigurable UL-DL configuration candidates/intersection of UL subframes, ii) a DL/UL HARQ timeline of UL-DL configuration including intersection of DL subframes of reconfigurable UL-DL configuration candidates/union of UL subframes, iii) a DL/UL HARQ timeline of UL-DL configuration including union of DL subframes of reconfigurable UL-DL configuration candidates/ union of UL subframes, or iv) a DL/UL HARQ timeline of UL-DL configuration including intersection of DL subframes of reconfigurable UL-DL configuration candidates/ intersection of UL subframes.

Figure 9:
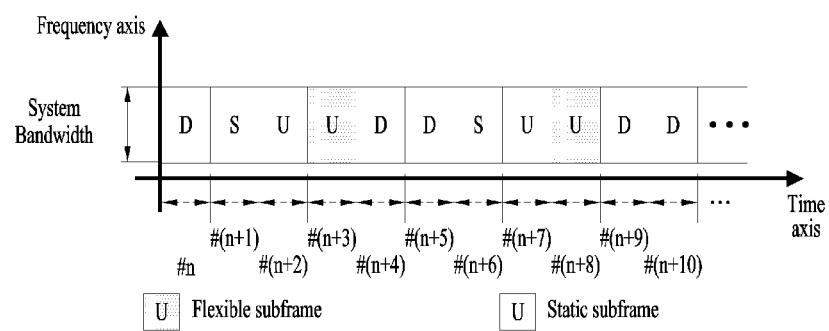
FIG. 9 is a diagram for a case of dividing (legacy) uplink subframes into a static uplink subframe set and a flexible uplink subframe set in TDD system environment.

FIG. 9 is a diagram for a case of dividing (legacy) uplink subframes into a static uplink subframe set and a flexible uplink subframe set in TDD system environment. A legacy uplink-downlink configuration, which is configured via an SIB (system information block) signal in FIG. 9, is assumed as an uplink-downlink configuration #1 (i.e., DSUUDDSUUD). It is assumed that a base station informs a user equipment of reconfiguration information of usage of a radio resource via a predetermined signal (e.g., RRC/MAC signal, SIB signal or a physical control/data channel).

In FIG. 9, interference characteristic may vary according to a UL subframe set different from each other. In consideration of this, it may be able to apply an independent UL power control method according to each resource type. For example, since it is highly probable for a neighbor cell to use corresponding subframes in a manner of changing the subframes to DL usage or UL usage, interference level or IoT (interference over thermal) level may be relatively higher than a static UL subframe set. Hence, if transmit power of data/control information transmitted in a flexible UL subframe set is set to be higher than transmit power of the data/control information transmitted in a static UL subframe set, it may be able to secure reliable communication. In particular, the aforementioned operation can secure UL communication of similar (or identical) quality irrespective of a type of an UL subframe set different from each other.

In addition, a method of controlling independent UL power according to a type of UL subframe set different from each other can include i) a method of separating all of an open-loop control parameter (e.g., $P_o$ (a semi-static base level), a (an open-loop path loss compensation component)) and a closed-loop control parameter (e.g., accumulative TPC command, absolute TPC command, a component dependent on the MCS) according to an UL resource type different from each other and ii) a method of separating a predetermined parameter only among the open-loop control parameter and the closed-loop control parameter.

Hence, as shown in FIG. 9, when independent UL power control methods are applied according to a UL resource type different from each other (or according to a type of an UL subframe set different from each other) in a wireless system in which a usage of a radio resource is dynamically changing, the present invention proposes methods for a UE to efficiently configure and report power headroom reporting (PHR).

In this case, a PHR value can be defined as "$PHR_{Type1,c}(i) = P_{CMAX,c}(i) - P_{PUSCH,c}(i)$" (i.e., a type 1 PHR) or "$PHR_{Type2,c}(i) = P_{CMAX,c}(i) - P_{PUSCH,c}(i) - P_{PUCCH,c}(i)$" (i.e., a type 2 PHR) according to i) whether simultaneous transmission of PUSCH and PUCCH is configured, ii) whether predetermined upper layer signal (extendedPHR) is configured, iii) whether a carrier aggregation technique (CA) is configured, iv) whether the PHR value is a value for a primary cell (PCell), or v) whether the PHR value is a value for a secondary cell (Scell). In this case, the $P_{CMAX,c}(i)$ indicates "UE transmission maximum power configured for a subframe i of a serving cell c", the $P_{PUSCH,c}(i)$ indicates "UE PUSCH transmit power configured for a subframe i of a serving cell c" and the $P_{PUCCH,c}(i)$ indicates "UE PUCCH transmit power configured for a subframe i of a serving cell c", respectively.

And, in the embodiments described in the following, it may be implicitly assumed that a PHR information reporting operation of a UE is performed only when an event for performing the PHR information reporting operation of the UE is satisfied. And, in the embodiments described in the following, assume that the PHR information reporting of the UE is performed via a predetermined signal format (e.g., a MAC signaling format).

Moreover, although the present invention represents two UL power control subframe sets using such a terminology as a static UL subframe set and a flexible UL subframe set, the static UL subframe set and the flexible UL subframe set can be extensively interpreted as a UL subframe set #0 and a UL subframe set #1, respectively.

Embodiment 1

According to a first embodiment of the present invention, a UE can be configured to calculate independent PHR values according to a UL resource type different from each other (or a UL power control subframe set different from each other) and report the values. The first embodiment can be efficiently used in a situation that independent UL power control methods are applied according to the UL resource type different from each other and transmit power (e.g., absolute UL Tx power or accumulated UL Tx power) is different from each other according to each UL resource type.

In particular, having received information necessary for the first embodiment of the present invention from a UE, a base station can efficiently perform UL resource allocation/ UL power control in consideration of available power of the UE according to a UL resource type different from each other. In this case, PHR information according to a UL subframe set of a type different from each other, which is reported by the UE, can be defined in such a form as $PHR_{Static\ SF}(n)$ and $PHR_{Flexible\ SF}(m)$. Moreover, the $PHR_{Static\ SF}(n)$ and the $PHR_{Flexible\ SF}(m)$ can be reported at the same time (i.e., "n=m") according to a predetermined rule and can be configured to be independently reported at timing different from each other (i.e., "n # m").

And, in the present embodiment, it is able to independently determine whether an event related to an operation of reporting PHR information (of the UE) is satisfied according to a UL resource type different from each other. Or, It is able to determine whether an event related to an operation of reporting final PHR information of a specific UL resource type is satisfied by union (or intersection) of information on whether an individual UL resource type satisfies PHR information reporting-related event.

And, in the present embodiment, it is able to independently determine whether an event related to an operation of reporting PHR information (of the UE) is satisfied according to a UL subframe set different from each other. Or, It is able to determine whether an event related to an operation of reporting final PHR information of a UL subframe set different from each other is satisfied by union (or intersection) of information on whether a UL subframe set different from each other satisfies PHR information reporting-related event.

And, the UE can be configured to report PHR information of a specific UL resource type (or a set of specific UL power control subframes) by an offset value for PHR information of a different UL resource type (or a set of different UL power control subframes). For example, if the $PHR_{Static\ SF}(n)$ corresponds to 10 dB and the $PHR_{Flexible\ SF}(m)$ corresponds to 7 dB, the UE can be configured to report an offset value (i.e., −3 dB) of the $PHR_{Flexible\ SF}(m)$ to the $PHR_{Static\ SF}(n)$.

Embodiment 2

According to a second embodiment of the present invention, a UE can be configured to calculate PHR values according to a UL resource type different from each other (or, according to a UL power control subframe set different from each other), select a relatively smaller PHR value or a smallest PHR value as a representative value and report the value. According to the present embodiment, it is able to reuse a legacy PHR reporting method (e.g., format of MAC signaling) as much as possible and it is able to prevent PHR reporting-related overhead from being increased.

Or, when the UE calculates PHR values according to a UL resource type different from each other (or, according to a UL power control subframe set different from each other), a lastly reported PHR value can be configured by a relatively bigger PHR value, a biggest PHR value or a PHR value calculated based on a predetermined function (e.g., an arithmetic mean value of PHR values which are derived according to a UL resource type different from each other (or, according to a UL power control subframe set different from each other), a harmonic mean value, an arithmetic mean value/harmonic mean value calculated after predetermined weights are applied to PHR values which are derived according to a UL resource type different from each other (or, according to a UL power control subframe set different from each other).

Embodiment 3

According to a third embodiment of the present invention, when PHR values are respectively calculated according to a UL resource type different from each other (or, according to a UL power control subframe set different from each other), a base station can be configured to additionally inform a UE of a reference maximum power value (of the UE) or a nominal maximum power of the UE via predetermined signal (e.g., physical layer signal or upper layer signal).

In this case, the reference maximum power values (or the nominal maximum power values) of the UL resource types different from each other can be defined as $P_{MAX,Static\ SF}(n)$ and $P_{MAX,Flexible\ SF}(m)$, respectively. The UE can calculate the PHR values for each of the UL resource types using the reference maximum power value (or the nominal maximum power value) additionally received via the predetermined signal (e.g., "$PHR_{Static\ SF,Type1,c}(n)=P_{MAX,StaticSF,c}(n)-P_{StaticSF,PUSCH,c}(n)$", "$PHR_{Flexible\ SF,Type1,c}(m)=P_{MAX,Flexible,c}(m)-P_{FlexibleSF,PUSCH,c}(m)$").

And, the base station can be configured to additionally inform the UE of the reference maximum power value (or, the nominal maximum power value) only, which is used when a PHR value of a specific UL resource type (or, a specific UL power control subframe set) is calculated, via predetermined signaling. For instance, the base station can be configured to inform the UE of a reference maximum power value (or a nominal maximum power value) (e.g., $P_{MAX,Static\ SF}(n)$) for a static UL subframe set only via predetermined signaling. In addition, when a PHR value of a remaining UL resource type, which is not received, (e.g., a flexible UL subframe set) is additionally calculated via predetermined signaling, the base station can be configured to use a legacy $P_{CMAX,c}(m)$ (or $\tilde{P}_{CMAX,c}(m)$).

Embodiment 4

According to a fourth embodiment of the present invention, it is able to configure a UE to transmit PHR information on a specific UL resource type (or, a specific UL power control subframe set) only when UL scheduling information (e.g., UL grant)-based UL data (PUSCH) is transmitted via the specific UL resource type or (UL) subframes of the specific UL resource type (or, subframes of the specific UL power control subframe set).

In this case, the UL scheduling information (i.e., UL grant) may correspond to scheduling information (UL grant) of closest timing enabling UL data to be transmitted via a subframe of a specific UL resource type after i) timing of satisfying a PHR information reporting-related event (of the UE) related to the specific UL resource type, ii) timing of satisfying a PHR information reporting-related event (of the UE) related to a random UL resource type, or iii) timing of satisfying a PHR information reporting-related event (of the UE) related to at least one or more UL resource types. Or, the UL scheduling information may correspond to scheduling information (UL grant) of closest timing enabling UL data to be transmitted via the subframe of the specific UL resource type after timing of satisfying the i), ii), and iii) events including the timing. As a concrete example, $PHR_{Static\ SF}(n)$ information can be configured to be (restrictively) transmitted only when UL scheduling information-based UL data is transmitted via a static UL subframe set.

And, the UE can be configured to transmit PHR information on a specific UL resource type (or a specific UL power control subframe set) via a UL subframe in which a closest UL scheduling information (UL grant)-based UL data is transmitted. In this case, the closest UL scheduling information-based UL data can be received at timing after timing (or including the timing) of satisfying i) PHR information reporting operation-related event (of the UE) related to the specific UL resource type (or the specific UL power control subframe set), ii) PHR information reporting operation-related event (of the UE) related to a random UL resource type (or a random UL power control subframe set), or iii) PHR information reporting operation-related event (of the UE) related to at least one or more UL resource types (or at least one or more UL power control subframe sets).

If the PHR information reporting operation-related events (of the UE) related to a plurality of UL resource types are satisfied at the same time (e.g., if it is able to independently define whether PHR is triggered according to a UL power control subframe set), it is able to configure PHR information interlocked with a UL resource type (or UL power control subframe set) in which a UL data channel (PUSCH) is actually transmitted to be valid only. For instance, the UE can be configured to report the PHR information, which is assumed or determined as valid based on the aforementioned methods, to the base station only.

Moreover, based on the aforementioned proposed method, when a UE completes a PHR information reporting operation for a specific UL resource type, the UE can be configured to cancel triggered PHRs related to the specific UL resource type only, which are triggered before timing (or including the timing) of completing the PHR information reporting operation. Or, the UE can be configured to cancel all triggered PHRs related to a UL resource type, which are triggered before timing (or including the timing) of completing the PHR information reporting operation.

Moreover, when the proposed method is applied, if PHR information reporting-related events (of the UE) for a plurality of UL resource types are satisfied at the same time, PHR information reporting for a specific UL resource type can be defined to be preferentially performed according to a rule defined in advance. Or, it may consider that PHR information reporting operation-related event (of the UE) for a predetermined specific UL resource type is satisfied only. For instance, if a PHR information reporting operation-related event for a static UL subframe set and a PHR information reporting operation-related event for a flexible UL subframe set are satisfied at the same time, it may be able to configure the PHR information reporting for the static UL subframe set to be preferentially performed and it may be able to consider that the PHR information reporting-related event (of the UE) for the static UL subframe set is satisfied only.

For instance, the UE can transmit PHR information of a static UL subframe set only when UL scheduling information (i.e., scheduling information (UL grant) of closest timing enabling UL data to be transmitted via a subframe of a static UL resource type after timing (or including the timing) of satisfying PHR information reporting operation-related event (of the UE) related to the static UL resource type)-based UL data (PUSCH) is transmitted via the static UL subframe set (i.e., PHR information reporting for a flexible UL subframe set can be omitted).

Moreover, when the proposed method is applied, if PHR information reporting-related events (of the UE) for a plurality of UL resource types are satisfied at the same time, PHR information reporting for a UL subframe power control set of a relatively lower index can be defined to be preferentially performed according to a rule defined in advance. Or, it may consider that a PHR information operation-related event (of the UE) for the UL subframe power control set of a relatively lower index is satisfied only. In this case, as an example, if an index of a static UL subframe set and an index of a flexible UL subframe set are defined by 0 and 1, respectively, and PHR information reporting operation-related events for the two UL subframe sets are satisfied at the same time, PHR information reporting for the static UL subframe set of a relatively lower index can be defined to be preferentially performed. Or, it may consider that the PHR information reporting operation-related event for the static UL subframe set of a relatively lower index is satisfied only.

Similarly, when the proposed method is applied, if PHR information reporting-related events (of the UE) for a plurality of UL resource types are satisfied at the same time, PHR information reporting for a UL subframe power control set of a relatively higher index can be defined to be preferentially performed according to a rule defined in advance. Or, it may consider that a PHR information operation-related event (of the UE) for the UL subframe power control set of a relatively higher index is satisfied only.

Embodiment 5

According to a fifth embodiment of the present invention, all or a part of a plurality of PHR values, which are calculated according to a UL resource type (or, a UL power control subframe set), can be configured to be transmitted only when UL scheduling information (UL grant)-based UL data is transmitted via a specific UL resource type (or, a specific UL power control subframe set). In this case, PHR information, which are reported by a UE on specific timing, can be (restrictively) configured to have PHR information only related to a UL power control subframe set of which a predetermined PHR information reporting operation-related event (of the UE) is satisfied.

And, the PHR information, which are reported by the UE on the specific timing, can be configured to have PHR information related to all UL subframe sets or PHR information related to all predetermined UL subframe sets, if at least one UL subframe set among a plurality of predetermined UL subframe sets satisfies a PHR information reporting operation-related event (of the UE).

In this case, the UL scheduling information (UL grant) corresponds to scheduling information (UL grant) of closest timing enabling UL data to be transmitted via a subframe of a specific UL resource type after timing (or including the timing) of satisfying the PHR information reporting operation-related event (of the UE).

As a concrete example, all or a part of a plurality of PHR values (e.g., $PHR_{Static\ SF}(n)$ and $PHR_{Flexible\ SF}(n)$), which are calculated according to a UL resource type, can be configured to be transmitted only when UL scheduling information (UL grant)-based UL data is transmitted via a static UL subframe set. Or, all or a part of a plurality of PHR values (e.g., $PHR_{Static\ SF}(n)$ and $PHR_{Flexible\ SF}(n)$), which are calculated according to a UL resource type, can be configured to be transmitted only when UL scheduling information (UL grant)-based UL data is transmitted via a flexible UL subframe set.

After the UE completes all or a part of a reporting operation for a plurality of the PHR values, which are calculated according to a UL resource type, it may be able to configure actually reported UL resource type-related triggered PHRs before timing (or including the timing) of completing the reporting operation to be cancelled only. Or, it may be able to configure all UL resource type-related triggered PHRs before timing (or including the timing) of completing the reporting operation to be cancelled.

Embodiment 6

All or a part of a plurality of PHR information, which are calculated according to a UL resource type (or, a UL power control subframe set), can be configured to be transmitted via a UL subframe in which a closest UL scheduling information (UL grant)-based UL data is transmitted, which is received after timing (or including the timing) of satisfying a predetermined PHR information reporting operation-related event (of a UE). The aforementioned method indicates that a subframe in which PHR information on a specific UL resource type (or, a specific UL power control subframe set) is actually transmitted is not restricted by subframes related to the UL resource type (or, the UL power control subframe set).

And, PHR information, which are reported by a UE on specific timing, can be (restrictively) configured to have PHR information related to a UL subframe set satisfying a predetermined PHR information reporting operation-related event (of the UE) only.

If at least one UL subframe set among a plurality of predetermined UL subframe sets satisfies the PHR information reporting operation-related event (of the UE), the PHR information, which are reported by the UE on specific timing, can be configured to have PHR information related to all UL subframe sets (or, PHR information related to all predetermined UL subframe sets).

After the UE completes (all or a part of) a reporting operation for a plurality of the PHR values, which are calculated according to a UL resource type, based on the present embodiment, it may be able to configure actually reported UL resource type-related triggered PHRs before timing (or including the timing) of completing the reporting operation to be cancelled only. Or, it may be able to configure all UL resource type-related triggered PHRs before timing (or including the timing) of completing the reporting operation to be cancelled.

Embodiment 7

According to a seventh embodiment of the present invention, it is able to configure a UE to calculate and report PHR information on a specific UL resource type (or, a specific UL power control subframe set) only. For example, when a dynamic change of a radio resource usage is applied in TDD system, it is able to configure the UE to calculate and report PHR information (i.e., $PHR_{Static\_SF}(n)$) on a static UL subframe set only. And, the aforementioned method can also be interpreted as the UE does not calculate and report PHR information (i.e., $PHR_{Flexible\_SF}(m)$) on a flexible UL subframe set.

In addition, it is able to configure the UE to report PHR information on a specific UL resource type based on a UL data channel (PUSCH) of scheduling information of closest timing enabling UL data to be transmitted via a subframe of the specific UL resource type after timing (or including the timing) of satisfying a PHR information reporting operation-related event (of the UE) related to the specific UL resource type. Or, it is able to configure the UE to transmit PHR information on a specific UL resource type via a closest UL scheduling information (UL grant)-based UL data channel (PUSCH), which is received after timing (or including the timing) of satisfying a PHR information reporting operation-related event (of the UE) related to the specific UL resource type.

Embodiment 8

According to an eighth embodiment of the present invention, it is able to configure a base station to independently inform a UE of i) PHR value ranges, ii) range values related to PHR reporting, or iii) a range value related to PHR reporting and a step size of UL resource types different from each other via predetermined signal (e.g., physical layer signal or upper layer signal). For example, in case of the PHR ranges, $PHR_{Static\_SF}(n)$ can be configured to be rounded by a closest value in a range of [4; −23] dB having a step size of 1 dB and $PHR_{Flexible\_SF}(n)$ can be configured to be rounded by a closest value in a range of [30; −33] dB having a step size of 1 dB.

And, it is able to configure the base station to inform the UE of a PHR value range/a PHR reporting-related range value/a PHR reporting-related range value and a step size of a specific UL resource type (or, a specific UL power control subframe set) by an offset value for a PHR value range/a PHR reporting-related range value/a PHR reporting-related range value and a step size of a different UL resource type (or, a different UL power control subframe set). For instance, when a dynamic change of a radio resource usage is applied in TDD system, a PHR value range (or a PHR reporting-related range value) of a flexible UL subframe set can be informed in a form of an offset value (e.g., if the offset value is set to −10 dB, the range of the PHR value of the flexible UL subframe set can be configured by +30 dB~−33 dB) for a PHR value range (i.e., +40 dB~−23 dB) of a static UL subframe set.

Embodiment 9

According to a ninth embodiment of the present invention, it is able to configure a base station to inform a UE of PHR information on a specific UL resource type (or a specific UL power control subframe set) via an indicator transmitted based on a predetermined signal format (e.g., a physical layer signal format or an upper layer signal format).

In this case, the indicator (e.g., 1 bit (If the indicator corresponds to 0, it indicates PHR information on a static UL subframe set. If the indicator corresponds to 1, it indicates PHR information on a flexible UL subframe set)) can be defined in a manner of reusing (reinterpreting) a specific field (e.g., UL index/DAI/Carrier indicator/SRS request field etc.) of a DCI format 0 or a DCI format 4 in which UL scheduling information (UL grant) is transmitted or can be implemented in a manner of newly defining a field of the aforementioned usage in the DCI formats. Or, the indicator can be defined in a manner of reusing (reinterpreting) a specific field of a DCI format in which DL scheduling information (DL grant) is transmitted or can be implemented in a manner of newly defining a field of the aforementioned usage in the DCI formats.

Embodiment 10

According to a tenth embodiment of the present invention, when PHR information on a specific UL resource type (or, a specific UL power control subframe set) is reported or a plurality of PHR information, which are calculated according to a UL resource type (or, a UL power control subframe set), are reported, a specific field/bit of a (legacy) signal format (e.g., a MAC signal format) used for an operation of reporting the PHR information can be configured to be reused (by a UE) as an indicator indicating the UL resource type (or the UL power control subframe set).

In particular, a base station can identify a UL resource type (or a UL power control subframe set) of each specific PHR information which is reported via the indicator (e.g., 1 bit (If the indicator corresponds to 0, it indicates PHR information on a static UL subframe set. If the indicator corresponds to 1, it indicates PHR information on a flexible UL subframe set)). For example, a reserved bit of a power headroom MAC control element can be defined as an indicator indicating a UL resource type (or a UL power control subframe set). FIG. 10 (a) shows cases to which the present embodiment is applied.

As a different example, in case of an extended power headroom MAC control element, since a reserved bit exists only when a V field (In this case, the V field is indicated when a power headroom (PH) value is based on actual transmission or a reference format) has a value of 0 (i.e., for both a type 1 and a type 2, if the V corresponds to 0, it indicates that an octet including a relevant $P_{CMAX,c}$ field exists. If the V corresponds to 1, it indicates that the octet including the relevant $P_{CMAX,c}$ field is omitted), in order to reuse the reserved bit as an indicator indicating a UL resource type (or a UL subframe set), a value of the V field can be (restrictively) configured by 0. FIG. 10 (b) shows cases to which the present embodiment is applied.

In addition, when PHR information on a specific UL resource type is reported or a plurality of PHR information, which are calculated according to a UL resource type, are reported, a field/bit in which an indicator indicating a UL resource type is transmitted can be newly defined in a (legacy) signal format (e.g., a MAC signal format) used for an operation of reporting the PHR information.

Embodiment 11

According to an eleventh embodiment of the present invention, it is able to configure a UE to calculate PHR values according to a UL resource type (or a UL power control subframe set) different from each other, select a relatively bigger PHR value as a representative PHR value based on a predetermined rule and report the representative PHR value. Or, it is able to configure the UE to select a relatively smaller PHR value (or a smallest PHR value) as a representative PHR value based on a predetermined rule and report the representative PHR. In this case, it is able to configure a specific field/bit of a (legacy) signal format (e.g., a MAC signal format), which is used for reporting the representative PHR value, to be (re)used as an indicator indicating a UL resource type (or a UL power control subframe set) from which the representative PHR value is derived.

Embodiment 12

According to a twelfth embodiment of the present invention, a base station can configure i) periodicPHR-Timer and/or ii) prohibitPHR-Timer and/or iii) dl-PathlossChange, which are independently applied according to a UL resource type different from each other, to a UE (to configure power backoff value, which is required due to a change of measured DL path loss and power management (allowed by P-MPR$_c$) to trigger power headroom reporting (PHR)) via a predetermined signal (e.g., RRC signal).

And, if an identical periodicPHR-Timer and/or prohibitPHR-Timer and/or dl-PathlossChange is configured between a part of predetermined UL resource types (or UL subframe sets) or a common periodicPHR-Timer and/or prohibitPHR-Timer and/or dl-PathlossChange is configured for a part of predetermined UL resource types (or UL subframe sets) via a common signal (e.g., RRC signal), an independently applied periodicPHR-Timer and/or prohibitPHR-Timer and/or dl-PathlossChange can be configured according to the rest of the UL resource type (or UL subframe set).

In addition, the base station can configure periodicPHR-Timer and/or prohibitPHR-Timer and/or dl-PathlossChange commonly applied to UL resource types (or UL subframe sets) different from each other to the UE (e.g., via a predetermined signal (e.g., RRC signal)) or a common periodicPHR-Timer and/or prohibitPHR-Timer and/or dl-PathlossChange can be configured between UL resource types (or UL subframe sets) different from each other via a single common signal (e.g., RRC signal).

Embodiment 13

According to a thirteenth embodiment of the present invention, a method of reporting PHR of a specific UL power control subframe set (or a specific UL resource type) can be limited to a form of a specific PHR type (e.g., a type 1 PHR/a type 2 PHR) according to a rule determined in advance. For example, UL control information (e.g., PUCCH, PUSCH W/(piggybacked) UCI) can be configured not to be transmitted in a flexible UL subframes in consideration of relatively higher interference amount or interference characteristic of which change is relatively severe in the flexible UL subframe set. In particular, the UL control information can be configured to be transmitted via a static subframe set, which is relatively stable and has a low interference characteristic. In this case, a method of reporting PHR for a flexible UL subframe set can be restricted to "Type 1 PHR" and a method of reporting PHR for a static UL subframe set may not be restricted to a specific type. In this case, it may be interpreted as the aforementioned method consider a flexible UL subframe set as a (virtual) Scell (i.e., PUCCH and PUSCH are unable to be transmitted at the same time) in a situation to which carrier aggregation (CA) technique is applied.

Embodiment 14

According to a fourteenth embodiment of the present invention, PHR information of a specific UL resource type (or a specific UL power control subframe set) can be configured to be derived in a manner of considering/reflecting a specific UL resource type (or a specific UL power control subframe set)—related power control command until timing (i.e., SF #K) of receiving UL scheduling information (UL grant) (satisfying a predetermined event) after timing (including the timing) of satisfying i) PHR information reporting operation-related event (of the UE) related to the specific UL resource type (or the specific UL power control subframe set), ii) PHR information reporting operation-related event (of the UE) related to a random UL resource type (or a random UL power control subframe set), or iii) PHR information reporting operation-related event (of the UE) related to at least one or more UL resource types (or at least one or more UL power control subframe sets).

Or, PHR information of a specific UL resource type (or a specific UL power control subframe set) can be configured to be derived in a manner of considering/reflecting a specific UL resource type (or a specific UL power control subframe set)—related power control command until timing (i.e., SF #L) of a UL subframe in which an actual PUSCH is transmitted via the specific UL resource type (or the specific UL power control subframe set) after timing (including the timing) of satisfying i) PHR information reporting operation-related event (of the UE) related to the specific UL resource type (or the specific UL power control subframe set), ii) PHR information reporting operation-related event (of the UE) related to a random UL resource type (or a random UL power control subframe set), or iii) PHR information reporting operation-related event (of the UE) related to at least one or more UL resource types (or at least one or more UL power control subframe sets).

In this case, for example, the specific UL resource type (or, the specific UL power control subframe set) power control command may correspond to a specific UL power control subframe set-related open-loop control parameter (e.g., P$_o$ (i.e., a semi-static base level), a (i.e., an open-loop path-loss compensation component)) and/or a closed-loop control parameter (e.g., accumulated TPC command, absolute TPC command, a component dependent on the MCS).

In this case, the UL scheduling information (UL grant) indicates control information scheduling UL data (PUSCH) on which PHR information of a specific UL resource type (or, a specific UL power control subframe set) is transmitted.

For instance, the UL scheduling information (UL grant) can be limited to closest scheduling information enabling UL data to be transmitted via a subframe of the specific UL resource type after timing (or including the timing) of satisfying i) PHR information reporting operation-related event (of the UE) related to the specific UL resource type, ii) PHR information reporting operation-related event (of the UE) related to a random UL resource type, or iii) PHR information reporting operation-related event (of the UE) related to at least one or more UL resource types. Or, the UL scheduling information (UL grant) can be limited to closest UL scheduling information (UL grant) received after timing (or including the timing) of satisfying i) PHR information reporting operation-related event (of the UE) related to the specific UL resource type, ii) PHR information reporting operation-related event (of the UE) related to a random UL resource type, or iii) PHR information reporting operation-related event (of the UE) related to at least one or more UL resource types (i.e., a subframe in which PHR information on the specific UL resource type is actually transmitted may not be restricted to the subframes related to the specific UL resource type).

And, PHR information of a specific UL resource type (or a specific UL power control subframe set) can be configured to be derived in a manner of considering/reflecting a power control command of most recent timing or a power control command of closest past timing related to the specific UL resource type (or the specific UL power control subframe set) until timing (including the timing) of receiving UL scheduling information (UL grant) (satisfying the aforementioned predetermined event) after timing (including the timing) of satisfying i) PHR information reporting operation-related event (of the UE) related to the specific UL resource type (or the specific UL power control subframe set), ii) PHR information reporting operation-related event (of the UE) related to a random UL resource type (or a random UL power control subframe set), or iii) PHR information reporting operation-related event (of the UE) related to at least one or more UL resource types (or at least one or more UL power control subframe sets).

Or, PHR information of a specific UL resource type (or a specific UL power control subframe set) can be configured to be derived in a manner of considering/reflecting a power control command of most recent timing or a power control command of closest past timing related to the specific UL resource type (or the specific UL power control subframe set) until timing (i.e., SF #L) of a UL subframe in which actual PUSCH (satisfying the aforementioned predetermined event) is transmitted after timing (including the timing) of satisfying i) PHR information reporting operation-related event (of the UE) related to the specific UL resource type (or the specific UL power control subframe set), ii) PHR information reporting operation-related event (of the UE) related to a random UL resource type (or a random UL power control subframe set), or iii) PHR information reporting operation-related event (of the UE) related to at least one or more UL resource types (or at least one or more UL power control subframe sets). In this case, for instance, the UL subframe in which the actual PUSCH is transmitted can be restricted to a UL subframe of a specific UL resource type (or a specific UL power control subframe set) or can be configured by a UL subframe of all UL resource types (or all UL power control subframe sets).

Figure 11:
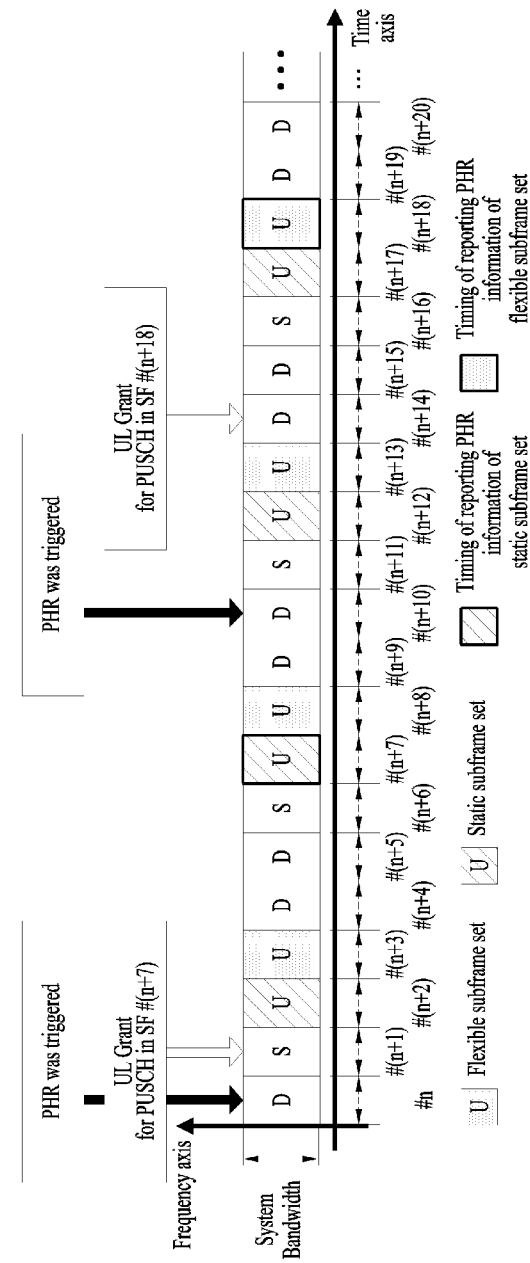
FIGS. 11 and 12 are diagrams for a case of reporting PHR information which is calculated in accordance with a type of an uplink resource according to the present invention.

FIG. 11 shows a UL subframe configuration to which the present embodiment is applied. In FIG. 11, assume a case that PHR information on a specific UL resource type is configured to be transmitted only when UL scheduling information (e.g., UL grant)-based UL data (PUSCH) is transmitted via the specific UL resource type or (UL) subframes of the specific UL resource type.

In FIG. 11, PHR information of a static subframe set is derived in a manner of considering/reflecting a static subframe set-related power control command (e.g., static UL subframe set-related open-loop control parameter (i.e., $P_{o,Static\ SF}$ (i.e., a semi-static base level), $\alpha_{Static\ SF}$ (i.e., an open-loop path-loss compensation component)) and/or closed-Loop Control Parameter (i.e., accumulative TPC command, absolute TPC command, a component dependent on the MCS)) until an SF #(n+1) corresponding to timing of receiving UL scheduling information (UL grant). And, PHR information of a flexible subframe set is derived in a manner of considering/reflecting a flexible subframe set-related power control command (e.g., $P_{o,Flexible\ SF}$ (i.e., a semi-static base level), $\alpha_{Flexible\ SF}$ (i.e., an open-loop path-loss compensation component)) and/or closed-Loop control Parameter (e.g., accumulative TPC command, absolute TPC command, a component dependent on the MCS)) until an SF #(n+14) corresponding to timing of receiving UL scheduling information (UL grant). And, a UE can be configured to derive PHR information in a manner of considering/reflecting a subframe set-related power control command until timing of a UL subframe in which PUSCH is actually transmitted (i.e., an SF #(n+7) in case of a static subframe set or an SF #(n+8) in case of a flexible subframe set).

Figure 12:
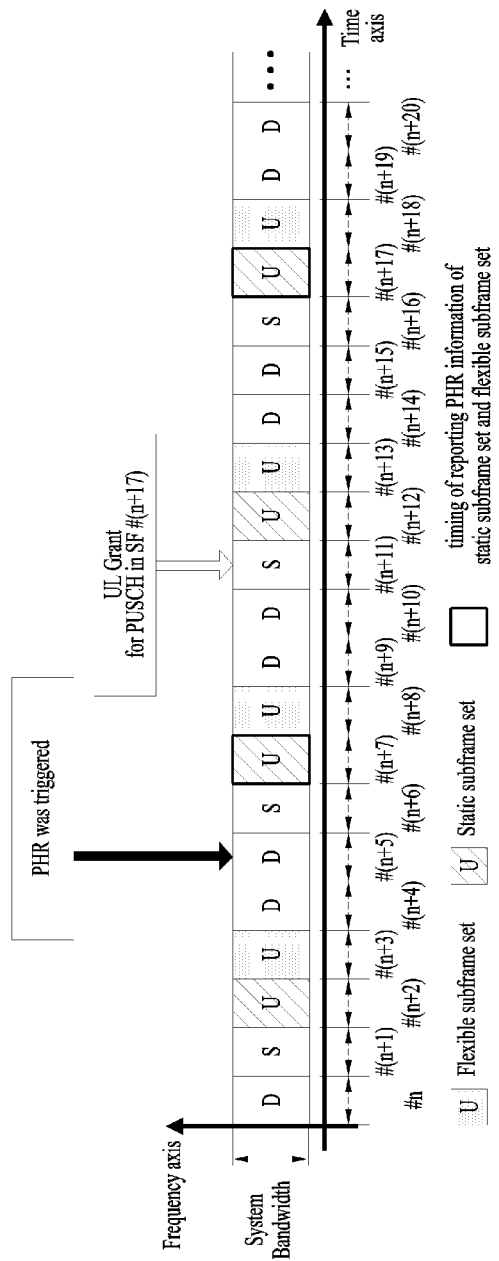

FIG. 12 shows a case that all of a plurality of PHR information, which are calculated according to a UL resource type, are configured to be transmitted via a UL subframe in which a closest UL scheduling information (IL grant)-based UL data is transmitted. In this case, the UL data is received after timing (or including the timing) of satisfying an event related to a predetermined PHR information reporting operation (of a UE).

In FIG. 12, PHR information of a static subframe set and PHR information of a flexible subframe set can be derived in a manner of independently considering/reflecting a power control command related to each of the subframe sets until an SF #(n+11) corresponding to timing of receiving UL scheduling information (UL grant), respectively. Moreover, it may also be able to configure PHR information related to each of the subframe sets to be derived in a manner of considering/reflecting a power control command related to each of the subframe sets until timing (i.e., an SF #(n+17)) of a subframe in which PUSCH is actually transmitted.

Embodiment 15

In a fifteenth embodiment of the present invention, a case of applying subframe-dependent UL power control is explained. If the subframe-dependent UL power control is applied, it is also necessary to define an operation of a UE for power headroom reporting (PHR). In other word, this is because, since an independent UL power control parameter is applied to subframe sets different from each other, occurrence of the aforementioned event for PHR triggering may vary according to each subframe set.

Hence, if the aforementioned PHR triggering event is satisfied for at least one or more subframe sets, a UE transmits PHR for all subframe sets to a base station (eNB). To this end, it may additionally define a new container (e.g., a PHR MAC control element) including PHRs for a plurality of subframe sets of a single CC.

Embodiment 16

A sixteenth embodiment of the present invention proposes an operation of a UE for power headroom reporting (PHR) when subframe-dependent UL power control is applied.

If the aforementioned PHR triggering event is satisfied for at least one or more subframe sets, the UE transmits representative PHR to a base station (eNB). In this case, the representative PHR can be defined by PHR including a minimum value among PHRs for all subframe sets. Moreover, in the present embodiment, the UE may or may not report an index of a subframe including minimum PHR.

Embodiment 17

A seventeenth embodiment of the present invention proposes an operation of a UE for power headroom reporting (PHR) when subframe-dependent UL power control is applied.

If the aforementioned PHR triggering event is satisfied for at least one or more subframe sets, the UE can transmit PHR (e.g., PHR information of a flexible subframe set (or, PHR information of a static subframe set)) of a predetermined subframe set to a base station.

Embodiment 18

According to a related art, if at least one or more cells (component carriers) related to a carrier aggregation (CA) technique satisfy a predetermined PHR triggering event, a UE transmits PHR information on all cells related to the carrier aggregation technique at the same time via a predetermined container (e.g., a PHR MAC control element).

For example, assume a situation that two cells (e.g., a PCell and a Scell) are used using a carrier aggregation technique, UL-DL configuration of the (SIB1-based) PCell corresponds to UL-DL configuration #1 and UL-DL configuration of the (tdd-Config-r10-based) SCell corresponds to UL-DL configuration #1. In this case, if a PHR triggering-related event occurs in a DL subframe #0 of the Scell and PUSCH transmission (i.e., PUSCH transmitted in the Scell)—related scheduling information (UL grant) of a UL subframe #7 is received in a special subframe #1 of the Scell, a UE transmits PHR information on the PCell and the Scell to the PUSCH transmitted in the SF #7 via a predetermined container. In this case, PHR information of an individual cell is derived in a manner of independently considering/reflecting each of cell-related recent power control commands until a SF #1 corresponding to timing of receiving UL scheduling information (UL grant) or in a manner of considering/reflecting each of the cell-related recent power control commands until timing of a SF #7 in which PUSCH is actually transmitted.

Yet, in the same example, if a specific cell (e.g., Scell) related to the carrier aggregation technique is managed in a manner of dynamically changing usage of a radio resource (i.e., "eIMTA-enabled cell") (and/or (two) UL power control subframe sets are configured to the specific cell), a part of cells (e.g., eIMTA-enabled Scell of which DL HARQ reference configuration is configured as UL-DL configuration #5 via upper layer signal) can use a subframe as DL usage when PHR information of (all) cells related to the carrier aggregation technique are transmitted (e.g., UL SF#7).

Hence, in this case, the eighteenth embodiment of the present invention proposes a method of efficiently deducting PHR information of cells related to the carrier aggregation technique.

For example, assume a case that a partial eIMTA-enabled cell (e.g., eIMTA-enabled Scell) reuses a subframe of timing (e.g., UL SF#7) of transmitting PHR information of cells (e.g., non-eIMTA PCell, eIMTA-enabled Scell) related to the carrier aggregation technique as DL usage (i.e., a case that eIMTA-enabled Scell reuses a tdd-Config-r10-based UL subframe in a manner of changing usage to DL usage). In this case, i) a UE can be configured to report PHR information of eIMTA-enabled cell as PHR information of a UL power control subframe set including a subframe (e.g., SF #7) which is reused for DL usage, ii) the UE can be configured to report the PHR information of eIMTA-enabled cell as PHR information of a predetermined (or signaled) specific UL power control subframe set, iii) the UE can be configured to report the PHR information of eIMTA-enabled cell as a predetermined (or signaled) specific value, or iv) the UE can be configured to report the PHR information of eIMTA-enabled cell as PHR information of a UL power control subframe set including a subframe, which is actually used for UL usage in closest past timing, without including the subframe (e.g., SF #7) which is reused for DL usage.

As a different example, assume a case that a partial non-eIMTA-enabled cell uses a subframe of timing of transmitting PHR information of cells related to the carrier aggregation technique as DL usage. In this case, i) a UE can be configured to report PHR information of non-eIMTA cell as PHR information on a subframe, which is actually used for UL usage in closest past timing (without including a subframe used for DL usage), ii) the UE can be configured to report the PHR information of non-eIMTA cell as a predetermined (or signaled) specific value, iii) the UE can be configured to report the PHR information of non-eIMTA cell as PHR information on a UL subframe, which is interlocked with a DL subframe in which UL grant is transmittable in closest past timing, (including a subframe which is used for DL usage), or iv) the UE can be configured to report the PHR information of non-eIMTA cell as PHR information on a UL subframe, which is interlocked with a DL subframe in which UL grant is transmittable in closest past timing, (without including a subframe which is used for DL usage).

Moreover, the aforementioned embodiments of the present invention can be extensively applied to a case that all or a part of (SIB1/tdd-Config-r10-based) UL-DL configurations of cells (or component carriers) related to carrier aggregation technology are differently configured and/or a case that at least one or more cells related to the carrier aggregation technique are managed in a manner of dynamically changing usage of a radio resource, and/or a case that (two) UL power control subframe sets are configured to the at least one or more cells and the like.

As a further different example, assume a case that (SIB1/tdd-Config-r10-based) UL-DL configurations of cells (or component carriers) related to carrier aggregation technology are different from each other (e.g., if SIN1 UL-DL configuration of non-eIMTAPCell corresponds to UL-DL configuration #2 and tdd-Config-r10-based UL-DL configuration of eIMTA-enabled Scell corresponds to UL-DL configuration #1) and a case that a specific cell (e.g., eIMTA-enabled Scell) related to the carrier aggregation technique is managed in a manner of dynamically changing usage of a radio resource (and/or a case (two) UL power control subframe sets are configured to the specific cell). In this case, at the timing (e.g., UL grant received in a SF #3 of non-eIMTAPCell) of receiving control information, which schedules PUSCH (e.g., PUSCH transmitted in a SF#7 of non-eIMTAPCell) on which PHR information of (all) cells related to the carrier aggregation technique are transmitted, a partial cell (e.g., eIMTA-enabledSCell) can use a subframe of the timing as UL usage.

In this case, when a partial cell uses the subframe of the timing of receiving control information (UL grant), which schedules PUSCH on which PHR information of (all) cells related to the carrier aggregation technique are transmitted, as UL usage, if the cell corresponds to an eIMTA-enabled cell, i) a UE can be configured to report PHR information of the eIMTA-enabled cell as PHR information of a UL power control subframe set including a UL subframe of the timing (e.g., SF #3), ii) the UE can be configured to report PHR information of the eIMTA-enabled cell as PHR information of a UL power control subframe set including a subframe, which is actually used for UL usage in closest past timing, without including the timing (e.g., SF #3), iii) the UE can be configured to report PHR information of the eIMTA-enabled cell as PHR information of a predetermined (or signaled) specific UL power control subframe set, or iv) the UE can be configured to report PHR information of the eIMTA-enabled cell as a predetermined (or signaled) specific value.

As a further different example, when a partial cell uses a subframe of timing of receiving control information, which schedules PUSCH on which PHR information of (all) cells related to the carrier aggregation technique are transmitted, as UL usage, if the cell corresponds to a non-eIMTA-enabled cell, i) a UE can be configured to report PHR information of the non-eIMTA-enabled cell as PHR information related to a UL subframe of the timing, ii) the UE can be configured to report the PHR information of the non-eIMTA-enabled cell as a predetermined (or signaled) specific value, or iii) the UE can be configured to report the PHR information of the non-eIMTA-enabled cell as PHR information on a subframe, which is actually used for UL usage in closest past timing without including the corresponding timing.

Moreover, the aforementioned configurations/rules can be extensively applied to a case that (SIB1/tdd-Confog-r-10-based) UL-DL configurations of cells (or component carriers) related to the carrier aggregation technique are identically configured and/or a case that at least one or more cells related to the carrier aggregation technique are managed in a manner of dynamically changing usage of a radio resource and/or a case that (two) UL power control subframe sets are configured to the at least one or more cells and the like.

Since the aforementioned examples of the present invention can be included as one of the methods of implementing the present invention, it is apparent that the examples are considered as embodiments of the present invention. And, although the aforementioned embodiments of the present invention can be independently implemented, the embodiments can be implemented by a combined form or an aggregated form of a part of the embodiments.

In addition, the aforementioned embodiments of the present invention can be configured to be restrictively applied only when a dynamic change mode of radio resource usage is configured (e.g., when a base station configures the dynamic change mode of radio resource usage to a UE via a predetermined signal).

And, the aforementioned embodiments of the present invention can be configured to be restrictively applied i) only when a simultaneous transmission mode of PUSCH and PUCCH is configured, ii) only when the simultaneous transmission mode of PUSCH and PUCCH is not configured, iii) only when extendedPHR is configured, iv) to a PCell or an Scell, v) to a specific cell or a specific CC to which a dynamic change mode of radio resource usage is set, vi) only when a cross-carrier scheduling (CSS) scheme is configured, or vii) only when a self-scheduling scheme is configured.

Moreover, it is able to configure a base station to inform a UE of information on whether to apply the aforementioned embodiments of the present invention (or, information on configurations of the aforementioned proposed methods) via a predetermined signal (e.g., a physical layer signal or an upper layer signal).

Figure 13:
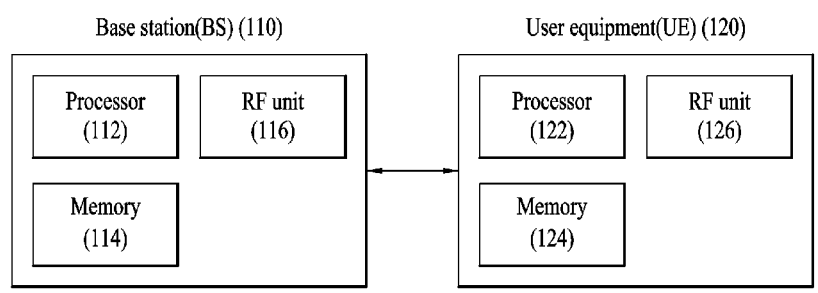
FIG. 13 is a diagram for a base station and a user equipment applicable to one embodiment of the present invention.

FIG. 13 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 13, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of performing power headroom reporting in a wireless communication system supporting a change of usage of a wireless resource and an apparatus therefor are described centering on examples applied to 3GPP LTE system, it may be applicable to various kinds of wireless communication systems as well as to the 3GPP LTE system.

What is claimed is:

1. A method of performing power headroom reporting by a user equipment (UE) in a wireless communication system supporting usage change of a radio resource, the method comprising the steps of:
   determining whether the power headroom reporting is triggered;
   transmitting, to a base station, power headroom reporting (PHR) information on two uplink subframe sets associated with a same serving cell,
   wherein the two uplink subframe sets comprise a first uplink subframe set and a second subframe set, which are configured to use different transmission power control parameters indicated by high layer signaling,
   wherein the PHR information is determined to be valid for only one uplink subframe set among the two uplink subframe sets, and the only one uplink subframe set includes an uplink subframe in which a Physical Uplink Shared Channel (PUSCH) comprising the PHR information is transmitted, and
   wherein the PHR information is rounded up to the closest value within a predetermined range at increments of 1 DB; and
   canceling triggered PHR related to the uplink subframe, which are triggered before the time of transmitting the PHR information.

2. The method of claim 1, wherein the power headroom reporting (PHR) information comprises a first PHR value for the first uplink subframe set and a second PHR value for the second uplink subframe set and wherein the first PHR value and the second PHR value are determined in a manner of being independent from each other.

3. The method of claim 1, wherein the power headroom reporting (PHR) comprises a representative power headroom reporting (PHR) value and wherein the representative PHR value corresponds to a smaller PHR value among a first PHR value for the first uplink subframe set and a second PHR value for the second uplink subframe set.

4. The method of claim 1, further comprising the step of receiving information related to reference maximum power from the base station,
   wherein the reference maximum power is set to the first uplink subframe set and the second uplink subframe set, respectively, and wherein the power headroom reporting (PHR) information is determined based on the reference maximum power.

5. The method of claim 1, wherein the power headroom reporting (PHR) is configured to be transmitted via a predetermined uplink subframe set only when uplink data is transmitted.

6. The method of claim 1, wherein the power headroom reporting (PHR) is configured to be calculated for a single radio resource only among the first uplink subframe set and the second uplink subframe set.

7. The method of claim 1, further comprising the step of receiving an indicator indicating a specific uplink subframe set from the base station.

8. The method of claim 1, further comprising the step of transmitting at least one or more fields on a specific signal format, which are received from the base station, in a manner of configuring the at least one or more fields as an indicator indicating a specific uplink subframe set.

9. The method of claim 1, wherein the first uplink subframe set and the second uplink subframe set are configured to be commonly applied by a specific timer.

10. The method of claim 1, wherein the power headroom reporting (PHR) information is restricted to a type 1 PHR or a type 2 PHR.

11. The method of claim 1, wherein the power headroom reporting (PHR) information is derived based on a power control command until timing of receiving UL control information or timing of a UL frame in which actual Physical Uplink Shared Channel (PUSCH) is transmitted.

12. The method of claim 1, wherein one among the two uplink subframe sets is composed of uplink subframes configured to be reconfigurable by higher layer signaling according to traffic adaptation.

13. A user equipment, performing power headroom reporting in a wireless communication system supporting usage change of a radio resource, comprising:
   a radio frequency unit; and
   a processor, the processor configured:
   to determine whether the power headroom reporting is triggered,
   to transmit, to a base station, power headroom reporting (PHR) information on two uplink subframe sets associated with a same serving cell,
   wherein the two uplink subframe sets comprise a first uplink subframe set and a second subframe set, which are configured to use different transmission power control parameters indicated by high layer signaling,
   wherein the PHR information is determined to be valid for only one uplink subframe set among the two uplink subframe sets, and the only one uplink subframe set includes an uplink subframe in which a Physical Uplink Shared Channel (PUSCH) comprising the PHR information is transmitted, and
   wherein the PHR information is rounded up to the closest value within a predetermined range at increments of 1 DB, and
   to cancel triggered PHR related to the uplink subframe, which are triggered before the time of transmitting the PHR information.

* * * * *